(12) United States Patent
Painchaud et al.

(10) Patent No.: US 9,869,817 B1
(45) Date of Patent: Jan. 16, 2018

(54) INTERFEROMETER BASED ON A TILTED MMI

(71) Applicants: Yves Painchaud, Quebec (CA); Alexandre D. Simard, Quebec (CA)

(72) Inventors: Yves Painchaud, Quebec (CA); Alexandre D. Simard, Quebec (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 15/371,933

(22) Filed: Dec. 7, 2016

(51) Int. Cl.
| | |
|---|---|
| *G02B 6/26* | (2006.01) |
| *G02B 6/28* | (2006.01) |
| *G01B 9/02* | (2006.01) |
| *G02B 6/125* | (2006.01) |
| *G02F 1/01* | (2006.01) |
| *G02B 6/12* | (2006.01) |

(52) U.S. Cl.
CPC ....... *G02B 6/2813* (2013.01); *G01B 9/02097* (2013.01); *G02B 6/125* (2013.01); *G02F 1/011* (2013.01); *G02B 2006/12159* (2013.01)

(58) Field of Classification Search
CPC .......... G02B 6/2813; G02B 6/125; G02B 2006/12159; G01B 9/02097; G02F 1/011
USPC ..... 385/1, 27–28, 31–32, 38, 39, 46–47, 50, 385/129–132, 4, 14
See application file for complete search history.

(56) References Cited

U.S. PATENT DOCUMENTS

| | | | | |
|---|---|---|---|---|
| 6,341,189 B1 * | 1/2002 | Deacon | ................ | G02B 6/1228 385/130 |
| 2005/0244103 A1 * | 11/2005 | Kwakernaak | ........ | G02B 6/2813 385/39 |

OTHER PUBLICATIONS

Jeong, S. et al., "Optical 90o hybrid with broad operating bandwidth of 94 nm"; Optics Letters, vol. 34, No. 22, Nov. 15, 2009, pp. 3505-3507, (3 pages).
Soldano, L. B. et al.; "Optical Multi-Mode Interference Devices Based on Self-Imaging: Principles and Applications"; IEEE Journal of Lightwave Technology, vol. 13, No. 4, Apr. 1995; pp. 615-627 (13 pages).

* cited by examiner

*Primary Examiner* — Akm Enayet Ullah
*Assistant Examiner* — Michael Mooney
(74) *Attorney, Agent, or Firm* — Osha Liang LLP

(57) ABSTRACT

An optical interferometer based on multi-mode interference (MMI) devices includes an input port, an output port, a first MMI device connected to the input port at an input face of the first MMI device, a second MMI device connected to the first output port at an output face of the second MMI device. In the optical interferometer, an output face of the first MMI device and an input face of the second MMI device are directly connected, the first MMI device includes a first and a second self-imaging points at an interface between the first MMI device and the second MMI device, and a propagation axis of the second MMI device is tilted with respect to a propagation axis of the first MMI device, causing a path length difference between an upper optical path via the first self-imaging point and a lower optical path via the second self-imaging point.

8 Claims, 9 Drawing Sheets

INTERFEROMETER BASED ON A TILTED MMI

FIELD OF INVENTION

The present invention relates generally to an interferometer based on two multi-mode interference (MMI) devices directly connected to each other, providing a precise control on a phase shift difference between different optical paths in the interferometer.

BACKGROUND OF INVENTION

A photonic integrated circuit is a device that integrates multiple photonic functions for information signals on optical wavelengths typically in the visible spectrum or near infrared 850 nm-1650 nm. Such photonic integrated circuits may include waveguides, beam splitters, beam combiners, phase shifters, photodetectors, amplifiers, and attenuators. Combinations of such optical elements may yield more complex optical elements, including modulators and interferometers (i.e. interference devices). Among various optical elements used in photonic integrated circuits, interferometers are widely used for measurements of small displacements, refractive index changes and other quantities in science and industry. An interferometer includes an optical beam splitter, a section of dissimilar path lengths, and an optical beam combiner. In an interferometer, an incoming light is split into multiple paths by the optical beam splitter (i.e. two or more paths), acquires different phase shifts through the different path lengths, and is re-combined by the optical beam combiner.

In particular, multi-mode interference (MMI) devices may provide beam splitters and beam combiners, and therefore may be included as elements of an interferometer. While most waveguides in photonic integrated circuits may be designed for a single mode propagation, MMI devices operate using a large number of modes.

Typically, a MMI device is fabricated as a simple wide rectangular stripe in a 2-dimensional flat plane and behaves as a multi-mode waveguide. In such a MMI device, an incoming optical information signal (used interchangeably herein with "light") of a certain transverse optical profile (i.e. the intensity of the incoming light varies in a direction transverse to the propagation direction) simultaneously excites multiple modes at an input face of the MMI device with different amplitudes which then propagate at different phase velocities. In the paraxial regime (i.e. an angle between an incoming light and the propagation direction always remains smaller than about 20 degrees), after a certain propagation distance, the modes excited at the input face are recombined in-phase such that they reproduce the optical transverse profile of the incoming light at the input face. This phenomenon is referred to as self-imaging. Furthermore, such self-imaging occurs at multiple-locations (referred herein to as "self-imaging points") during the propagation and allows a MMI device to split an incoming light into two or more reproductions of the incoming light at an output face of the MMI device. In particular, most MMI devices are designed to provide multiple reproductions of an incoming light at the output face with nearly equal intensities. In such a MMI device, output ports may be placed at self-imaging points, where the MMI device may act as a beam splitter. A MMI device, with two input ports for two incoming light beams, may act as a beam combiner.

Although single-mode waveguides are often used in integrated circuits, it is of a common use to provide adiabatic tapers as the input waveguides that bring the optical signal up to the input face of the MMI. In such a taper, the waveguide is single-mode at its input and becomes gradually multi-mode as its width increases towards the input face of the MMI. Providing small width single-mode waveguides up to the MMI input would cause strong divergence of the light inside the MMI. Increasing the size of the optical profile at the input face of the MMI device, through the use of tapers, allows to mitigate such diffraction and to remain closer to the paraxial regime.

A Mach-Zehnder type interferometer may be constructed by a combination of MMI devices, including a 1×2 MMI device (with one input port and two output ports, as a beam splitter) and a 2×2 MMI device (with two input ports and two output ports, as a beam combiner). An incoming light is split into two light beams by the 1×2 MMI device (beam splitter). Those light beams propagate in two separate paths (used interchangeably here in with "arms") towards the 2×2 MMI device (beam combiner). Since the two paths may have different lengths, the light beams propagating through the two paths experience different phase shifts, proportional to a difference between length of the two paths. Subsequently, the light beams enter the 2×2 MMI device (beam combiner). The output power of the 2×2 MMI device (beam combiner) vary in a wave pattern as a function of a phase shift difference, as a typical of a two-arms interferometer.

An optical hybrid interferometer may also be constructed by a combination of MMI devices, including a 2×4 MMI device (with two input ports and four outputs) and a 2×2 MMI device (with two input ports and two output ports). The 2×4 MMI device may be in the so-called paired-interference configuration. Two of the output ports of the 2×4 MMI device are connected to the two input ports of the 2×2 MMI device via two arms, respectively, which have different lengths as discussed previously. Such combination of MMI devices provides the functionality of a 90-degree optical hybrid as long as the phase shift of the bottom arm exceeds the phase shift of the upper arm by 45 degrees, as is known in the art.

For the interferometers with separate arms, as discussed above, their proper operation critically depends on the accuracy of a phase shift difference $\Delta\varphi$, between the two arms connecting the MMI devices, specifically only on $\Delta\varphi$, instead of a phase shift of $\varphi$ in one arm or one of $\varphi+\Delta\varphi$ in the other arm. However, for robustness of fabricated interferometer devises, the arms are commonly designed as short as possible (and accordingly a common phase shift value $\varphi$ as small as possible). In an interferometer device with long arms, small deviations in any characteristics in the device may result in substantial errors in the phase shift difference $\Delta\varphi$. Therefore, the device may not function as designed in conventional designs of interferometers with separate arms.

SUMMARY

In one aspect, one or more embodiments of the invention relate to an optical interferometer based on multi-mode interference (MMI) devices that includes a first input port, a first output port, a first MMI device connected to the first input port at an input face of the first MMI device, a second MMI device connected to the first output port at an output face of the second MMI device. In the optical interferometer, an output face of the first MMI device and an input face of the second MMI device are directly connected at an interface, the first MMI device includes a first and a second self-imaging points at the interface between the first MMI device and the second MMI device, and a propagation axis of the second MMI device is tilted with respect to a propagation axis of the first MMI device, causing a path length difference between an upper optical path via the first self-imaging point and a lower optical path via the second self-imaging point.

Other aspects of the invention will be apparent from the following description and the appended claims.

DETAILED DESCRIPTION

Figure 1:
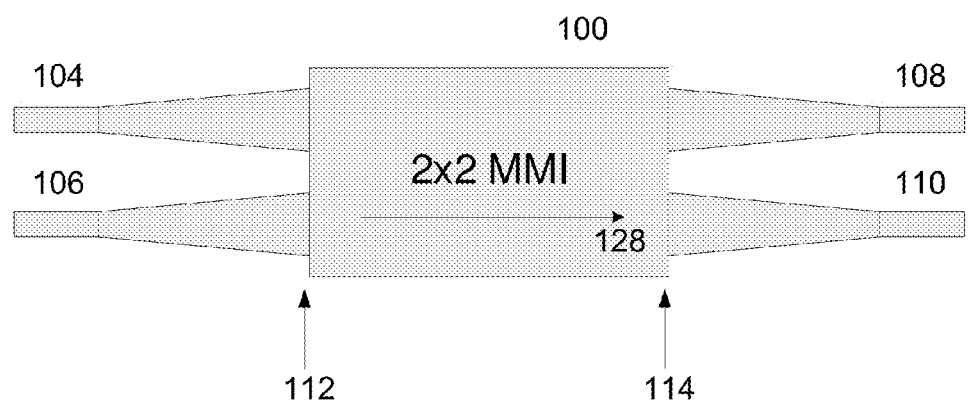
FIG. 1 illustrates an example of a 2×2 MMI device 100 in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e. any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 illustrates an example of a 2×2 MMI device 100 as an optical beam splitter or an optical beam combiner, including two input ports 104, 106 connected to an input face 112 of the 2×2 MMI device 100, and two output ports 108, 110 connected to an output face 114 of the 2×2 MMI device 100, in a 2-dimensional plane. As used herein, a m×n MMI device refers to a MMI device with m input ports and n output ports.

In the 2×2 MMI device 100 of FIG. 1, an incoming light from each of the input ports 104, 106 may excite multiple modes at the input face 112 of the 2×2 MMI device 100. The light in the multiple modes propagates along a propagation axis 128 of the MMI device 100 with different phase velocities, interferes with the other modes, and exits from the output ports 108, 110. When a light beam enters the 2×2 MMI device 100 from one of the input ports 104, 106, the 2×2 MMI device 100 may act as an optical beam splitter. When two light beams enters the 2×2 MMI device 100, one light beam from each of the input ports 104, 106, the 2×2 MMI device 100 may act as an optical beam combiner.

Figure 2A:
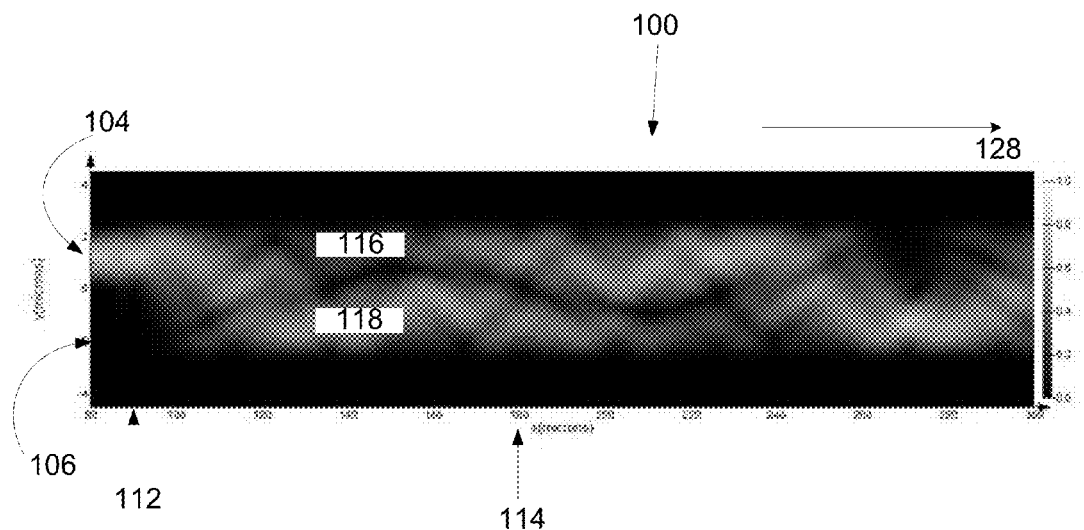
FIGS. 2(a) and 2(b) illustrate top views of simulated results of interference patterns inside a 2×2 MMI device 100 shown in FIG. 1 in accordance with one or more embodiments of the invention.
Figure 2B:
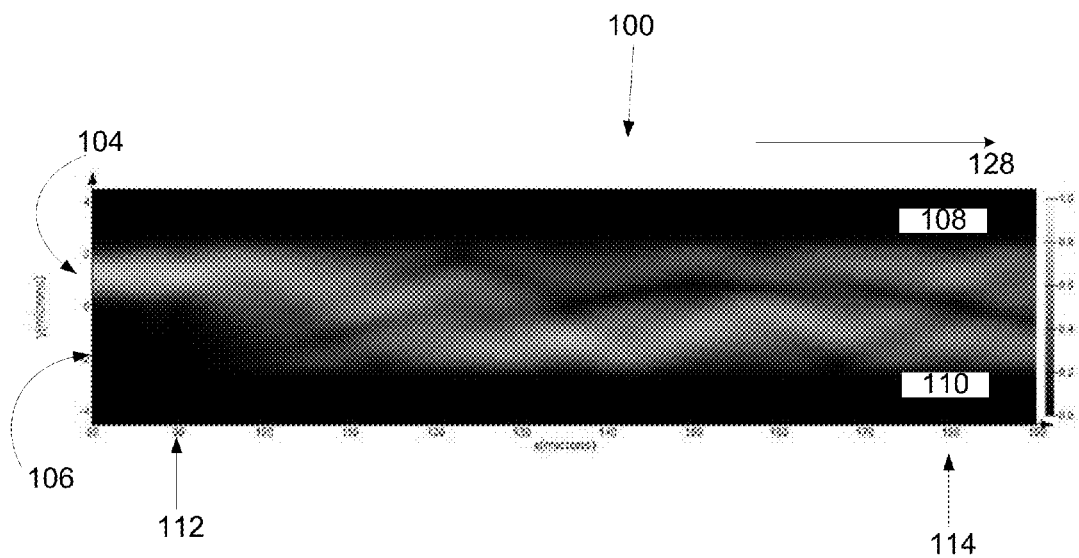

FIG. 2(a) illustrates a top view of simulated results of interference patterns of light propagating along the propagation axis 128 inside an arbitrarily long 2×2 MMI device 100 shown in FIG. 1. FIG. 2(b) illustrates an enlarged view of FIG. 2(a). Areas in white represent large amplitude of the light. In FIGS. 2(a) and 2(b), two input ports 104, 106 are connected to the MMI device 100 at the input face 112 located at x=90 μm and the width of the MMI device 100 is 5 μm (located between y=−2.5 μm and y=2.5 μm). An incoming light from the upper input port 104 excites multiple modes of the MMI device 100 which interfere as they propagate along the propagation axis 128.

In particular, at x=270 μm (180 μm from the input face 112), the modes interfere with the same phases as those they had at the input face 112 and, apart from a mirror inversion, reproduce the same field transverse distribution. This phenomena, in which the recombined light constructively interferes, is called a self-imaging. In addition to such a first self-image, at x=270 μm, of the incoming light at the input face 112, two self-images are formed at x=180 μm (90 μm from the input face 112, at a half of the first self-imaging length). Further, a separation between the two self-imaging points is half of the width of the MMI device 100 (2.5 μm, located between y=−1.25 μm and y=1.25 μm). Accordingly, if the output face 114, to which the output ports 108, 110 are connected, is located at x=180 μm, the MMI device 100 may act as a beam splitter to separate the incoming light from the input port 104 into the two output ports 108, 110.

FIG. 2(b) also shows that the two self-images are formed near the output face 114, at about x=180 μm over a few μm. As will be seen later, it is relevant to note that these self-imaging points have a certain longitudinal length. Over such a range of a few μm, a distance may be chosen to provide any value of a phase shift between 0 and 360 degrees acquired after propagation for the distance with a phase velocity, as an optical wavelength in a typical slab on which a photonic integrated circuit is fabricated, for example, silicon, is less than 1 μm.

Although FIGS. 1, 2(a), and 2(b) illustrate a particular arrangement of the 2×2 MMI device 100 which allows the MMI device to be applied as an optical beam splitter or an optical beam combiner, the scope of the invention should not be considered limited to these specific arrangements. For example, an optical beam splitter may include a 1×2 MMI device.

Figure 3:
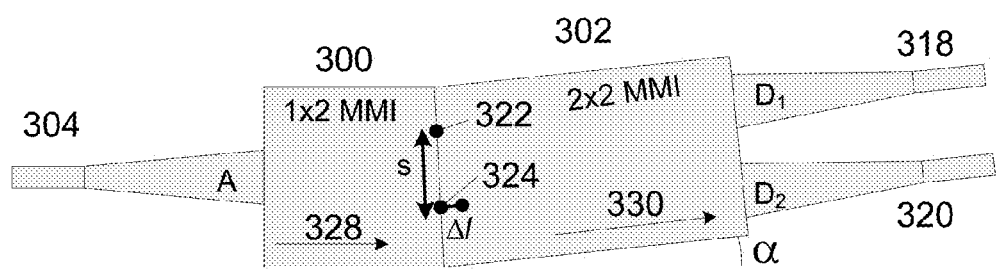
FIG. 3 illustrates an example of a Mach-Zehnder type interferometer in accordance with one or more embodiments of the invention.

FIG. 3 illustrates an example of a Mach-Zehnder type interferometer, including a 1×2 MMI device 300 and a 2×2 MMI device 302, according to one or more embodiments of the invention. In FIG. 3, the 1×2 MMI device 300 and the 2×2 MMI device 302 are directly connected, without use of any arms in between. A propagation axis 330 of the 2×2 MMI device 302 is tilted with respect to a propagation axis 328 of the 1×2 MMI device 300 by an angle α (referred herein to as "type-I tilting"). An incoming light enters the 1×2 MMI device 300 from an input port 304 of the 1×2 MMI device 300, propagates along the propagation axis 328, and is split into two light beams at self-imaging points 322, 324 of the 1×2 MMI device 300. Subsequently, the two light beams enter the 2×2 MMI device 302, propagate along the propagation axis 330, and exit from the output ports 318, 320. Due to the tilting of the 2×2 MMI device 302 with respect to the 1×2 MMI device 300, the lower path, via the lower self-imaging point 324, is longer than the upper path, via the upper self-imaging point 322, by Δl, $$\Delta l = s \tan \alpha,$$

where s denotes a separation between the self-imaging points 322, 324. According to the path length difference Δl, a phase shift difference between the light propagating via the upper path and the lower path is given by $$\Delta \phi = \frac{2\pi n_{eff} \Delta l}{\lambda} = \frac{\pi n_{eff} w \tan \alpha}{\lambda},$$

where $n_{eff}$ is the effective index of the MMI fundamental mode. In a MMI device, the fundamental mode's effective index $n_{eff}$ may be approximated as the effective index of the fundamental mode of the slab on which the photonic integrated circuit is fabricated.

The square of the absolute field amplitudes $D_1$ and $D_2$, at outputs 318, 320 of the 2×2 MMI device 302 are given by $$|D_1|^2 = |A|^2 \left( \frac{1 + \sin \Delta \phi}{2} \right),$$

$$|D_2|^2 = |A|^2 \left( \frac{1 + \sin \Delta \phi}{2} \right),$$

where the phase shifts experienced by the light beams propagating the upper path and the lower path are φ and φ+Δφ, respectively, and where A is the field amplitude at the input port. The absolute squares of the optical amplitudes $D_1$ and $D_2$, $|D_1|^2$ and $|D_2|^2$ are proportional to output powers at the output ports 318 and 320, respectively. Such sinusoidal behaviors in the output powers (i.e. the output power at the output ports vary in a wave pattern as a function of a phase shift difference, referred herein to as "modulation by a phase shift difference") are typical in a two-arms interferometer.

Accordingly, the Mach-Zehnder type interferometer illustrated in FIG. 3 may act as a non-even (i.e. $|D_1|^2$ and $|D_2|^2$ are not equal) beam splitter. Alternatively, when one of the output ports 318 and 320 is not used, the Mach-Zehnder type interferometer illustrated in FIG. 3 may act as an attenuator that decreases the optical power of an incoming light.

As discussed above, the separation s between the self-imaging points 322, 324 is a half of the width w of the 1×2 MMI device 300, w/2. Accordingly, in practical fabrication processes, such tilted angles may be precisely controlled lithographically to produce any phase shift difference Df with virtually no error. Thus, a small tilt between the beam splitter 300 and the beam combiner 302 may provide any desired phase shift. In this context, the lower self-imaging point 324 may be considered as a small path of length Δl instead of being punctual (while the self-imaging point 322 remains punctual).

Figure 4:
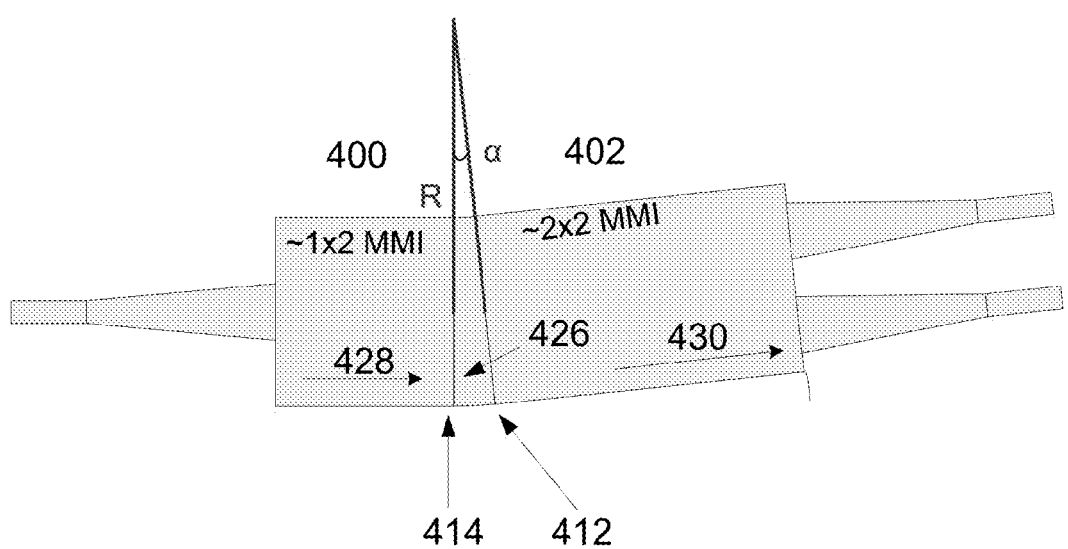
FIG. 4 illustrates alternative example of a Mach-Zehnder type interferometer in accordance with one or more embodiments of the invention.

FIG. 4 illustrates alternative example of a Mach-Zehnder type interferometer, which may act as a non-even beam splitter, including a 1×2 MMI device 400 and a 2×2 MMI device 402, according to one or more embodiments of the invention. In FIG. 4, a small curved section 426 of a MMI device is inserted between the output face 414 of the 1×2 MMI device 400 and input face 412 of the 2×2 MMI device 402. The curvature of the curved section 426 may be designed substantially large compared to the wavelength of the incoming light to avoid discontinuity between the 1×2 MMI device 400 and the 2×2 MMI device 402. Accordingly, a propagation axis 428 of the 1×2 MMI device 400 continuously transitions to a propagation axis 430 of the 2×2 MMI device 402, which is tilted with respect to the propagation axis 428 of the 1×2 MMI device 400 by an angle α (referred herein to as "type-II tilting").

A small curved section 426 may be a circular segment (i.e., a region that is bounded by an arc of less than 180° of a circle and by the chord connecting the endpoints of the arc). In FIG. 4, a radius R and a central angle α of the arc (which is equal to the tilted angle α) may be chosen as half of the width of the 2×2 MMI device 402 and the same value as the tilted angle α in FIG. 3, respectively, to provide produce a substantially similar phase shift difference Δφ as in FIG. 3.

Figure 5:
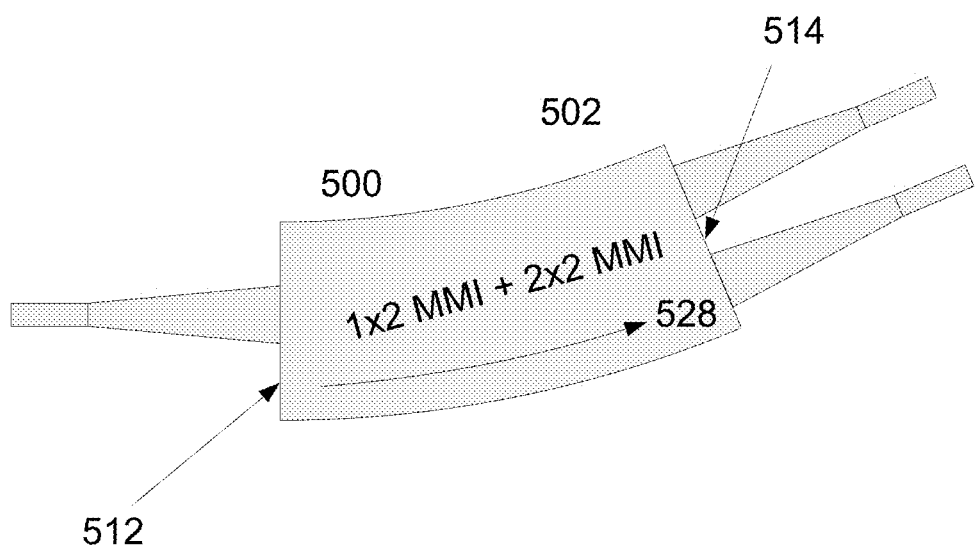
FIG. 5 illustrates alternative example of a Mach-Zehnder type interferometer in accordance with one or more embodiments of the invention.

FIG. 5 illustrates alternative example of a Mach-Zehnder type interferometer, which may act as a non-even beam splitter, including a 1×2 MMI device 500 and a 2×2 MMI device 502, according to one or more embodiments of the invention. In FIG. 5, the tilting in FIG. 3 is replaced by a continuously varying curvature along the edges of the 1×2 MMI device 500 and the 2×2 MMI device 502. Accordingly, a propagation axis 528 continuously varies along the edges of the 1×2 MMI device 500 (referred herein to as "type-III tilting"). As a result, the output face 514 of the 2×2 MMI device 502 is tilted with respect to an input face 512 of the 1×2 MMI device 500.

Figure 6:
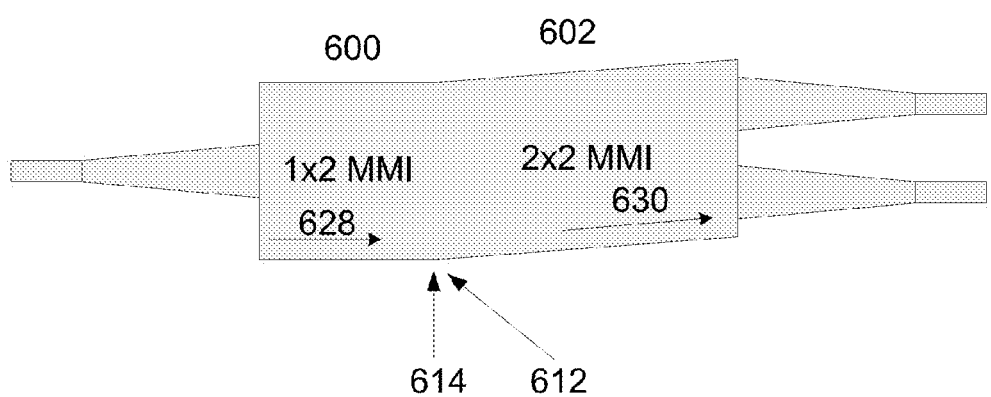
FIG. 6 illustrates alternative example of a Mach-Zehnder type interferometer in accordance with one or more embodiments of the invention.

FIG. 6 illustrates alternative example of a Mach-Zehnder type interferometer, which may act as a non-even beam splitter, including a 1×2 MMI device 600 and a 2×2 MMI device 602, according to one or more embodiments of the invention. In FIG. 6, the 2×2 MMI device 602 has a non-rectangular parallelogram shape. Accordingly, a propagation axis 630 of the 2×2 MMI device 602 is tilted with respect to a propagation axis 628 of the 1×2 MMI device 600 (referred herein to as "type-IV tilting"). Since a phase shift difference Δφ required for a practical interferometer is typically small (i.e. less than 2-3 degrees), such combination of the rectangle 1×2 MMI device 600 and the parallelogram shape 2×2 MMI device 602 may provide a sufficient phase shift difference Δφ. Further, since the output face 614 of the 1×2 MMI device 600 may be placed parallel to an input face 612 of the 2×2 MMI device 602, such combination may provide convenience for fabricating circuits and routing.

Figure 7:
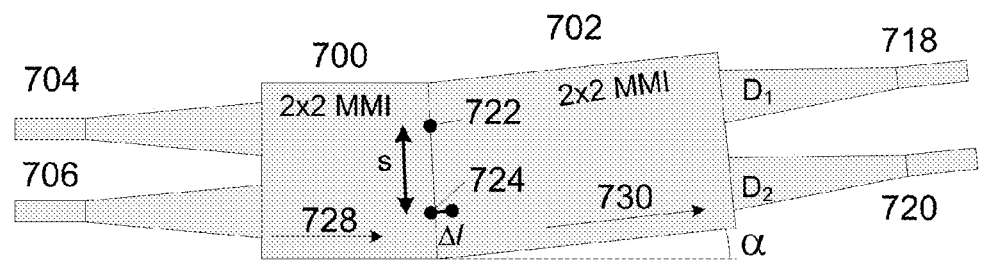
FIG. 7 illustrates alternative example of a Mach-Zehnder type interferometer in accordance with one or more embodiments of the invention.

FIG. 7 illustrates an example of a Mach-Zehnder type interferometer including two 2×2 MMI devices 700, 702, according to one or more embodiments of the invention. In FIG. 7, the 2×2 MMI device 700 and the 2×2 MMI device 702 are directly connected, without use of any arms in between. A propagation axis 730 of the 2×2 MMI device 702 is tilted with respect to a propagation axis 728 of the 2×2 MMI device 700 by an angle α (type-I tilting).

When a light beam enters the 2×2 MMI device 700 from one of input ports 704, 706, the light beam propagates along the propagation axis 728, and is split into two light beams at self-imaging points 722, 724 of the 2×2 MMI device 700. Subsequently, the two light beams enter the 2×2 MMI device 702, propagate along the propagation axis 730, and exit from the output ports 718, 720. Accordingly, the Mach-Zehnder type interferometer may act as a beam splitter.

When two light beams enter the 2×2 MMI device 700, one light beam from each of the input ports 704, 706, the light beams propagate along the propagation axis 728, and are combined and re-split into two light beams at the self-imaging points 722, 724 of the 2×2 MMI device 700. Subsequently, the two beams enter the 2×2 MMI device 702, propagate along the propagation axis 730, and exit from the output ports 718, 720. The Mach-Zehnder type interferometer may act as a beam combiner.

Although FIG. 7 illustrates a particular arrangement of a Mach-Zehnder type interferometer, the scope of the invention should not be considered limited to these specific arrangements. For example, a Mach-Zehnder type interferometer may include type-II tilting, type-III tilting, or type-IV tilting.

Figure 8:
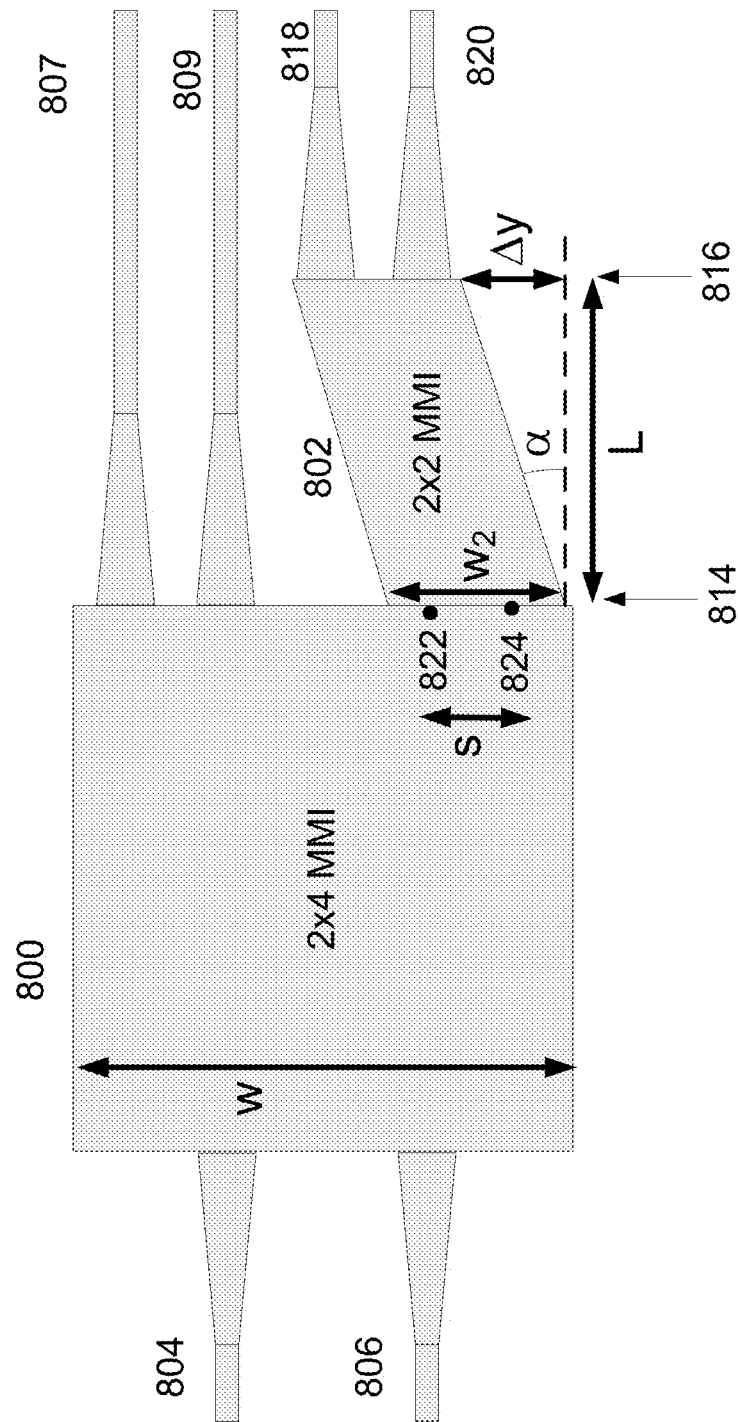
FIG. 8 illustrates an example of an optical hybrid type interferometer in accordance with one or more embodiments of the invention.

FIG. 8 illustrates an example of an optical hybrid type interferometer, including a 2×4 pair-interference MMI device 800 and a 2×2 MMI device 802, according to one or more embodiments of the invention. In FIG. 8, the 2×4 pair-interference MMI device 800 and the 2×2 MMI device 802 are directly connected with a tilted angle α (type-IV tilting), without arms in between. Output ports 807, 809 of the 2×4 pair-interference MMI device 800 are not connected to the 2×2 MMI device 802. This type of interferometer may be designed to provide the functionality of a 90° optical hybrid. To do so, a phase shift difference of 45° should be introduced between a lower path, via a lower self-imaging point 824 and an upper path, via an upper self-imaging point 822 at an output face 814 of the 2×4 MMI device 800. More precisely, the phase shift difference of 45° referred herein to is an amount by which the phase shift of the bottom arm exceeds the phase shift of the upper arm. A required tilted angle α to generate the phase shift of 45° difference Δφ is given by $$\tan\alpha = \frac{\lambda}{8sn_{\mathit{eff}}},$$

where λ denotes a wavelength of the incoming light, s denotes the separation of the self-imaging points and $n_{\mathit{eff}}$ is the effective index of the fundamental mode of either the slab, the 2×4 MMI 800 or the 2×2 MMI 802, all assumed to be virtually the same. The tilted angle α is structurally determined by $$\tan\alpha = \frac{\Delta y}{L},$$

where Δy denotes a displacement of the 2×2 MMI device 802 at an output face 816 of the 2×2 MMI 802 due to the tilting, and L denotes a length of the 2×2 MMI device 802. Further, an optimal length for a 2×2 MMI device for an optical hybrid type interferometer is known in the art as $$L = \frac{2n_{\mathit{eff}}w_2^2}{\lambda}.$$

A separation s between the self-imaging points 822, 824 in the 2×4 pair-interference MMI device 800 has been known to be one sixth of a width w of the 2×4 pair-interference MMI device 800. This separation also correspond to the input points in the 2×2 MMI device which is known to be optimally positioned when it corresponds to half of the width w2 of the 2×2 MMI device. Accordingly:

$$w_2 = 2s = \frac{w}{3}.$$

Therefore, by mixing the previous four equations, one obtains that the required displacement Δy is given by $$\Delta y = \frac{w}{6}.$$

Thus, an optimal structural configuration is independent of both the wavelength λ and the effective index $n_{\mathit{eff}}$ inside the 2×4 MMI 800 or the 2×2 MMI 802. Furthermore, the displacement Δy may be the only parameter to control in designing and fabricating an interferometer by combining such MMI devices. As a result, such interferometers may be expected to be robust to fabrication imperfections, as the arms between two MMI devices are reduced to zero and the common phase shift φ on the two arms may be eliminated.

Although FIG. 8 illustrates a particular arrangement of an optical hybrid type interferometer, the scope of the invention should not be considered limited to these specific arrangements. For example, an optical hybrid type interferometer may include type-I tilting, type-II tilting, or type-III tilting.

Figure 9:
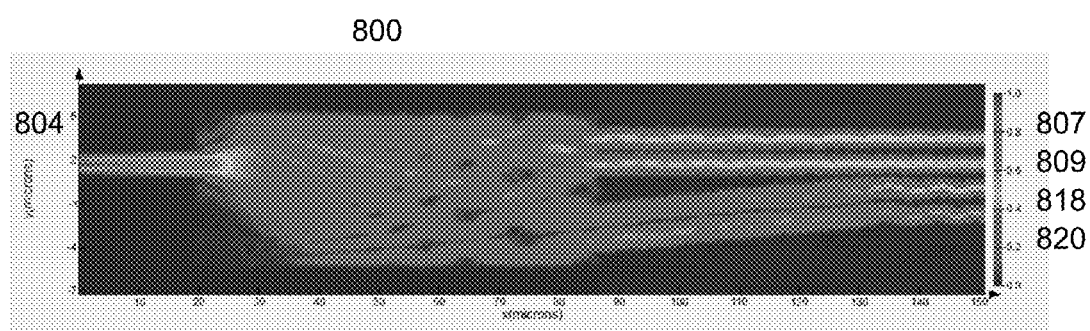
FIG. 9 illustrates a simulated results of interference patterns inside the optical hybrid type interferometer shown in FIG. 8 in accordance with one or more embodiments of the invention.

FIG. 9 illustrates simulated results of interference patterns inside the optical hybrid type interferometer shown in FIG. 8. FIG. 9 shows that an incoming light enters the 2×4 pair-interference MMI device 800 via the input port 804 and propagates towards the output ports 807, 809, and 818, and 820 of the 2×2 MMI device 802. The simulated results indicate that the required 45° phase shift was obtained as the optical hybrid type interferometer and two light beams of approximately equal amplitudes were produced at the output ports 818, 820. A wrong phase shift value would have produced light beams of dissimilar amplitudes at the output ports 818, 820.

The optical hybrid design without use of arms provides a superior design to those with arms, because minimizing the arm lengths results in maximizing the robustness against fabrication errors.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical interferometer based on multi-mode interference (MMI) devices comprising:
   a first input port;
   a first output port;
   a second output port;
   a first MMI device connected to the first input port at an input face of the first MMI device; and a second MMI device connected to the first output port and the second output port at an output face of the second MMI device;

wherein an output face of the first MMI device and an input face of the second MMI device are directly connected at an interface, the first MMI device includes a first and a second self-imaging points at the interface between the first MMI device and the second MMI device, a propagation axis of the second MMI device is tilted with respect to a propagation axis of the first MMI device, causing a path length difference between an upper optical path via the first self-imaging point and a lower optical path via the second self-imaging point, and a first input light beam enters the first MMI device from the first input port and is split into first and second light beams that are modulated based on the path length difference.

2. The optical interferometer of claim 1, wherein the first and the second light beams propagate in the first and the second MMI devices via the upper optical path and the lower optical path, respectively, the first light beam and the second light beam acquire a first phase shift and a second phase shift, respectively, the first and the second light beams are modulated by a phase shift difference between the first phase shift and the second phase shift, which is proportional to the path length difference between the upper optical path and the lower optical path, and the first and the second light beams exit the second MMI device from the first and the second output ports, respectively.

3. The optical interferometer of claim 1, wherein the first and the second light beams propagate in the first and the second MMI devices via the upper optical path and the lower optical path, respectively, the first light beam and the second light beam acquire a first phase shift and a second phase shift, respectively, the first and the second light beams are modulated by a phase shift difference between the first phase shift and the second phase shift, which is proportional to the path length difference between the upper optical path and the lower optical path, the first light beam is discarded, and the second light beam exits the second MMI device from the second output port.

4. The optical interferometer of claim 1, further comprising:

a second input port connected to the first MMI device at the input face of the first MMI device, wherein a second input light beam enters the first MMI device from the second input port, the first and second input light beams are combined and re-split into the first and second light beams, the first and the second light beams propagate in the first and the second MMI devices via the upper optical path and the lower optical path, respectively, the first light beam and the second light beam acquire a first phase shift and a second phase shift, respectively, the first and the second light beams are modulated by a phase shift difference between the first phase shift and the second phase shift, which is proportional to the path length difference between the upper optical path and the lower optical path, and the first and the second light beams exit the second MMI device from the first and the second output ports, respectively.

5. The optical interferometer of claim 1, further comprising:

a second input port connected to the first MMI device at the input face of the first MMI device, and a third and a fourth output ports connected to the first MMI device at the output face of the first MMI device, wherein a second input light beam enters the first MMI device from the second input port, the first and second input light beams are combined and re-split into the first and second light beams that propagate to the third and fourth output ports connected to the first MMI, and also into third and fourth light beams, the third and the fourth light beams propagate in the first and the second MMI devices via the upper optical path and the lower optical path, respectively, the first light beam and the second light beam acquire a first phase shift and a second phase shift, respectively, a phase shift difference by which the second phase shift exceeds the first phase shift, which is proportional to the path length difference between the upper optical path and the lower optical path, is 45 degrees.

6. The optical interferometer of claim 1, wherein a circular segment section of a MMI device is inserted between the first MMI device and the second MMI device, one side of the circular segment section is connected to the output face of the first MMI device, and the other side of the circular segment section is connected to the input face of the second MMI device, and the curvature of the circular segment section is substantially larger than the wavelength of the incoming light to avoid discontinuity between the first MMI device and the second MMI device.

7. The optical interferometer of claim 1, wherein the curvature of the edges of the first MMI device and the second devices varies continuously.

8. The optical interferometer of claim 1, wherein the second MMI device is of a non-rectangular parallelogram shape.

* * * * *